United States Patent [19]
Rafacz et al.

[11] Patent Number: 5,940,494
[45] Date of Patent: Aug. 17, 1999

[54] DATA DISPLAY SYSTEM AND METHOD FOR DISPLAYING REAL-TIME DATA RELATING TO AN AUTOMATIC CALL DISTRIBUTOR

[76] Inventors: Walter Rafacz, 1500 Golfview Ct., Glendale Heights, Ill. 60139; Kurt E. Sunderman, 906 Longmeadow Dr., Geneva, Ill. 60134

[21] Appl. No.: 08/501,345

[22] Filed: Jul. 12, 1995

[51] Int. Cl.$^6$ .......................... H04M 3/00; H04M 15/00
[52] U.S. Cl. .......................... 379/265; 345/329; 345/334; 345/335; 379/122; 379/136; 379/309
[58] Field of Search .......................... 379/111, 112, 379/113, 114, 115, 116, 214, 265, 266, 309, 122, 133, 134, 136; 345/326, 329, 333, 334, 335

[56] References Cited

U.S. PATENT DOCUMENTS 5,621,789  4/1997  McCalmont et al. ............... 379/113 X
5,715,306  2/1998  Sunderman et al. ............... 379/265

*Primary Examiner*—Harry S. Hong
*Attorney, Agent, or Firm*—Welsh & Katz, Ltd.

[57] ABSTRACT

A data display system 200 and method for displaying real-time data in a data display relating to operation of an automatic call distributor 100 is provided. A data presentation interface 202 defines the format of how the data is to be displayed, modifies the data display in response to instructions from a user 212 and presents the data display to the user 212. A data server interface 204 acquires the real-time data from the automatic call distributor 100, updates the data when individual data elements are changed and sends updated data, or specific data elements, to the data presentation interface 202 for display to the user 212. Communications between the data presentation interface 202 and the data server interface 204 are performed via a data link interface 206. The data link interface 206 may support direct communications or real-time data query language communications.

15 Claims, 2 Drawing Sheets

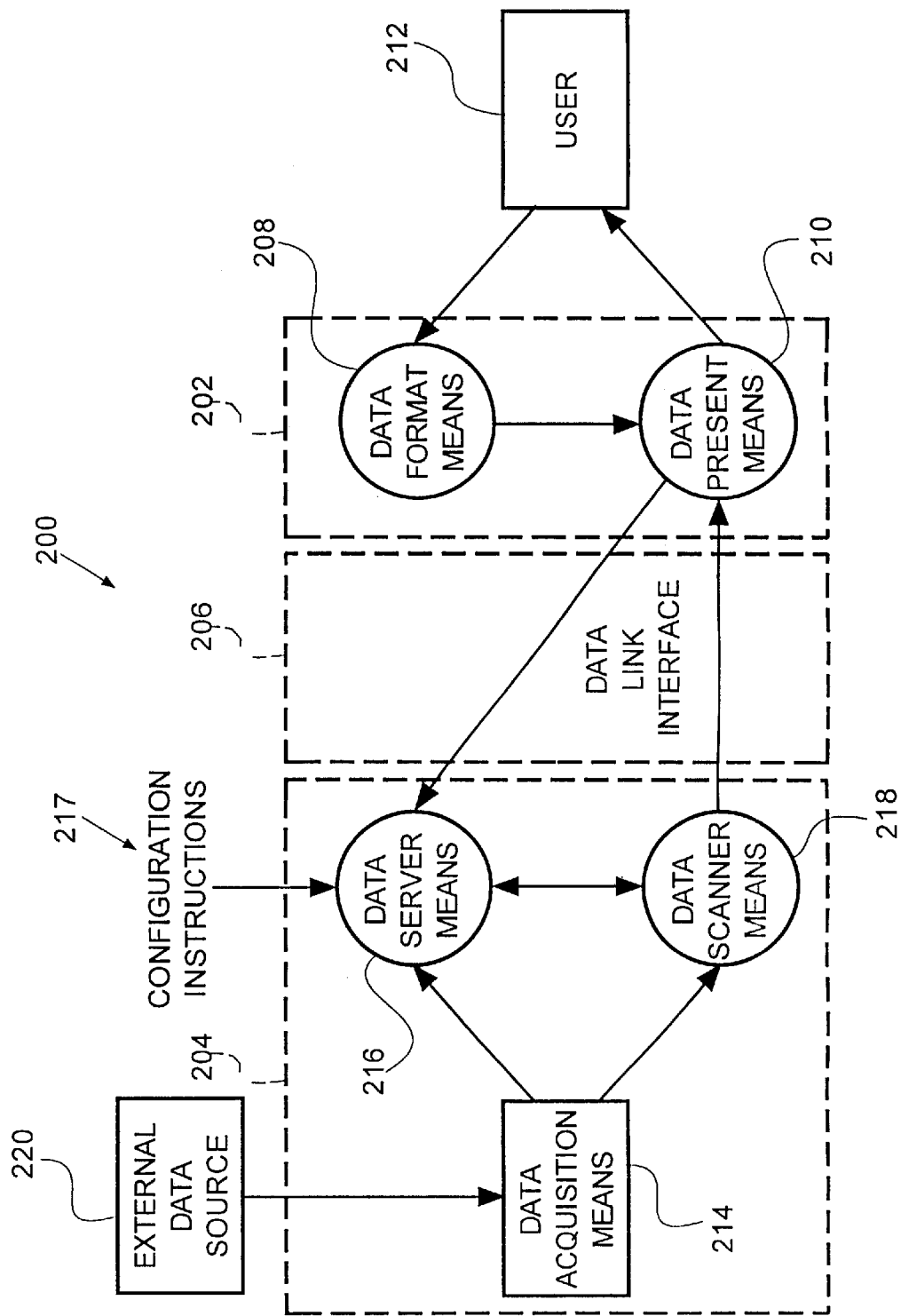

DATA DISPLAY SYSTEM AND METHOD FOR DISPLAYING REAL-TIME DATA RELATING TO AN AUTOMATIC CALL DISTRIBUTOR

BACKGROUND OF THE INVENTION

The present invention relates generally to a data display system for visually displaying data relating to the operation of an automatic call distributor and, more particularly, to a data display system and method for displaying real-time data relating to the operation of an automatic call distributor wherein a viewer of the data display is capable of modifying the types of data which is displayed, modifying how the data is displayed and modifying a time period at which the real-time data is updated from a display terminal connected to the automatic call distributor.

Display terminals for displaying data relating to the operation of an automatic call distributor are known. Automatic call distribution (ACD) systems are increasingly used by businesses to automatically route incoming customer calls to available agents. ACD systems generally include a multiport switch controlled by a central processing unit to interconnect external telephonic units of an external telephonic network with internal telephonic units. An example of such an ACD system is disclosed in U.S. Pat. No. 5,140,611 issued to Jones et al. on Aug. 18, 1992, entitled "Pulse Modulated Self-Clocking and Self-Synchronizing Data Transmission and Method for a Telephonic Communication Switching System".

ACD systems provide for acquiring, processing and reporting data concerning different aspects of activity within the system. Typically, a display terminal connected directly, or through a designated LAN network, to the automatic call distributor generates visual representations of the data. Based on these representations, management and other personnel are able to evaluate the call activity within the automatic call distributor and, if necessary, make changes for more efficient ACD system operation.

Data is collected on each incoming call offered to the ACD system. This data consists of a log of events occurring in the ACD system over time for an incoming call. Typical logged data elements are receipt of call, call offered to an application, call presented to an agent group and call handled or abandoned. The data representing these data elements is processed to generate reports, either printed or visual, for use by the ACD personnel. The data may be organized in any number of ways, such as by agent, telephone trunk, agent groups and the like.

The supervisor, or agent, preferably desires real-time data in order to make timely changes for more efficient ACD system or agent operation. Unfortunately, current display systems which display real-time data do not provide for modification of displays of real-time data by a viewer at the display terminal. Thus, if an agent needs to receive different, or additional, data, to have the data updated at different time periods or to only view certain data when the data exceeds a selected threshold value, prior display systems would have to be reprogrammed by a computer programmer to accomplish any of these tasks. As should be apparent, such reprogramming for virtually every change is relatively expensive and time consuming.

Accordingly, it is apparent that a need exists in the art for a data display system and method for displaying real-time data relating to operation of an automatic call distributor wherein an agent has the capability from an agent display terminal to modify the types of data which is displayed, modify how the data is displayed and modify time periods at which the real-time data is updated.

SUMMARY OF THE INVENTION

This need is met by a data display system and method for displaying real-time data relating to the operation of an automatic call distributor in accordance with the present invention. The data display system and method of the present invention permits an agent to modify the types of data which is displayed, modify how the data is displayed and modify time periods at which the real-time data is updated from an agent display terminal. the agent may also view and modify data received from an external source, such as a host computer.

In accordance with one aspect of the present invention, a data display system for displaying real-time data relating to operation of an automatic call distributor is provided. The data display system comprises a data server interface which collects at least a portion of the real-time data relating to the operation of the automatic call distributor. The collected real-time data is displayed to a user in a data display a data presentation interface. The data presentation interface permits the user to modify the at least one data display.

A data link interface, which preferably supports real-time data query language communications, may provide communications between the data server interface and the data presentation interface. The data server interface may comprise data acquisition means for acquiring, such as by downloading from the automatic call distributor, the at least a portion of the real-time data relating to the operation of the automatic call distributor. Data server means stores the at least a portion of the real-time data and updates data elements contained in the at least a portion of the real-time data in response to the data acquisition means and the user. Data scanner means monitors the real-time data stored in the data server means and transmits data elements which have been updated to the data presentation means.

The data presentation interface preferably comprises data format means for formatting the real-time data for display in the data display and for permitting modification of the formatting of the real-time data in response to the user. Data present means presents the real-time data in the data display in response to the data format means and the user.

In accordance with another aspect of the present invention, a method for displaying real-time data relating to operation of an automatic call distributor is provided. The real-time data being comprised of data elements. The method comprising the steps of: selecting data elements to be displayed; acquiring the selected data elements; updating the selected data elements; displaying the selected data elements in a data display to a user; and updating the data display substantially simultaneously as the selected data elements are updated. The method may comprise the steps of: modifying the selected data elements to be displayed by the user; acquiring the modified selected data elements; updating the modified selected data elements; displaying the modified selected data elements in the data display; and updating the data display substantially simultaneously as the modified selected data elements are updated.

These and other features and advantages of the present invention will become apparent from the following detailed description, the accompanying drawings and the appended claims.

BRIEF DESCRIPTION OF THE DRAWINGS

FIG. 2 is a schematic block diagram of the data display system in accordance with the present invention comprising a data presentation interface, a data server interface and a data link interface which may be implemented in the automatic call distributor shown in FIG. 1.

DETAILED DESCRIPTION OF THE INVENTION

Figure 1:
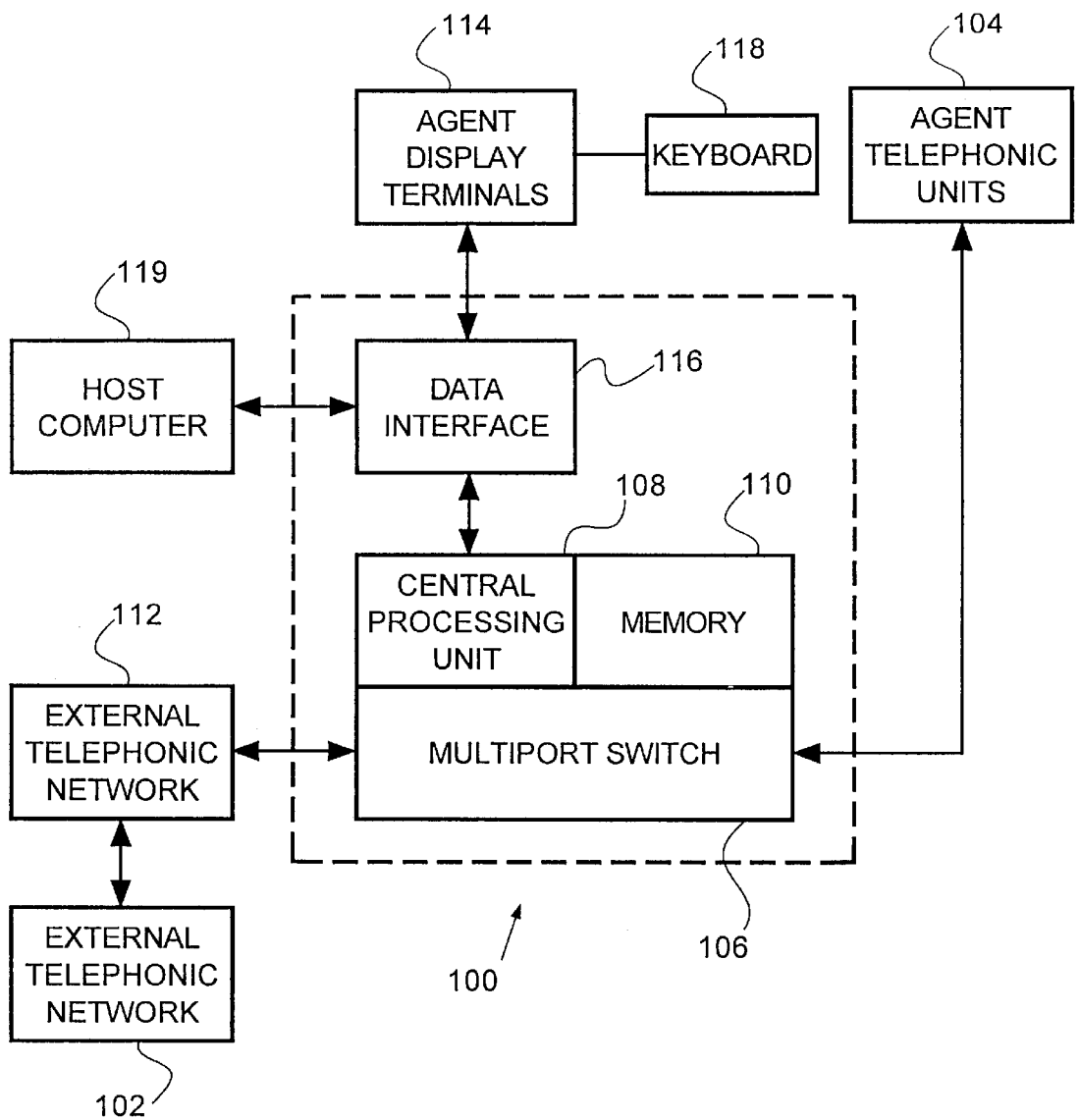
FIG. 1 is a block diagram of an automatic call distributor for routing incoming telephone calls received from an external telephonic network to agent telephonic units in which a data display system in accordance with the present invention may be implemented.

A data display system, shown in FIG. 2 at generally reference numeral 200, in accordance with the present invention for displaying information relating to operation of an automatic call distributor (ACD) 100 which interconnects callers using external telephonic units 102 and one of a plurality of agent telephonic units 104, shown in FIG. 1, is provided. The automatic call distributor 100 includes a multiport switch 106 controlled by a central processing unit 108 in conjunction with a memory 110 to selectively connect the plurality of agent telephonic units 104 to the external telephonic units 102 through an external telephonic network 112. The central processing unit 108, which may be one or more microprocessors, generally controls call distribution functions. Although a data display system and method in accordance with the present invention may be implemented in any of a number of automatic call distributors, or public branch exchanges (PBXs), they are preferably implemented in an automatic call distributor of the type shown in U.S. Pat. No. 5,400,327, entitled "Automatic Call Distributor With Wireless Connection With Remote Unit and Method", issued on Apr. 21, 1995 to Dezonno et al., and U.S. Pat. No. 5,140,611, entitled "Pulse Modulated Self-Clocking and Self-Synchronizing Data Transmission and Method for a Telephonic Communication Switching System", issued on Aug. 18, 1992 to Jones et al., the disclosures of which are hereby incorporated by reference.

Agent display terminals 114 are logically coupled to the central processing unit 108 via a data interface circuit 116, or card. The agent display terminals 114 preferably have cathode ray tubes (CRT) for providing information concerning activity within the automatic call distributor 100. Each of the agent display terminals 114 has an associated keyboard 118 for entry of commands, log-in and other information carried to and processed by the data interface card 116 or central processing unit 108. Further, each of the agent display terminals 114 has one of the agent telephonic units 104 associated therewith.

A host computer 119 communicates with the central processing unit 108 and the agent display terminals 114 through the data interface 116. As is well known, the host computer 119 stores information relating to callers and the like. The data interface circuit 116 may include a Motorola 68000 microprocessor and a dynamic random access memory (DRAM) for control of the display screen functions of the agent display terminals 114. In response to power up of the data interface circuit 116, the operating software and window processing routines for control of the agent display terminals 114 are downloaded from the memory 110 of the automatic call distributor 100 to the DRAM in the data interface circuit 116.

The software mechanisms used to implement the present invention are shown in block diagram form in FIG. 2. The present invention permits an agent, or user, to select, format, position and calculate real-time, historic and external data. External data would be any data received from a source other than the automatic call distributor 100 such as, for example, host data received from the host computer 119. With the present invention, the user may also define an update rate for the real-time data, define unique threshold values, define unique real-time display formats and select real-time names for the customized displays.

The data display system 200 comprises a data presentation interface 202, a data server interface 204 and a data link interface 206. The data presentation interface 202 is a graphical user interface (GUI) which comprises data format means 208 for defining the format, or layout, of the data displayed on the agent display terminals 114 and data present means 210 for displaying the formatted data to an user 212 in the format defined by the data format means 208. By inputting the appropriate commands to the data presentation interface 202 via one of the agent keyboards 118, the user 212 may perform a variety of modifications to the data display.

For example, the user 212 may select which real-time, historic and/or external data is presented in the display. The user 212 may further translate the data into desired forms. The user 212 can further perform arithmetic calculations on selected data, map selected data to GUI objects (graphical bars, pie charts and the like), modify the presentation of the real-time data (color, font, size, position, thresholds and the like) and enter and format text. The size of the display window on the agent display terminal 114 and the frequency at which specified data elements are updated may be modified. Criteria for displaying the data can be defined, such as threshold values for specified data elements. When the specified data elements exceed their respective threshold values, a desired display of the data elements is presented. For example, the user 212 may want to see a particular data element, such as the number of available agents, or see the data element with a warning if that data element exceeds a selected threshold value. With the present invention, each user 212 has the capability of setting a threshold value for each data element.

The user 212 may define links to other user defined displays, text data or retrieved data. As is commonly known in the art, links provide a path from one display, such as current status of an agent, to one or more other displays, such as a cumulative status of an agent. Links permit an agent to alternate between one or more different displays or show more than one display at a time. Unique names can be given by the user 212 to any or all of the modified displays. Thereafter, the user 212 would enter the unique name and the display would be set to the predefined format associated with the name.

The data present means 210 enables the user 212 to select which display to activate using the previously entered display name. The user 212 may also define a set of one or more displays to automatically activate upon startup of the agent display terminal 114. Using the data present means 210, the user 212 may resize the display window, set the frequency at which data updates are performed, view additional data and change the threshold values for any of the data elements.

The data server interface 204 is comprised of a data acquisition means 214, data server means 216 and data scanner means 218. The data acquisition means 214 logs changes in data received through notification from one or more external data sources 220, such as the host computer 119. The data acquisition means 214 further updates data elements based on fixed events, such as predefined time periods and the like. Resetting the data elements based on predefined conditions is also performed by the data acquisition means 214. Data elements may be reset at predefined occurrences, such as end of day, agent sign out, agent sign in, addition of one or more trunks and the like.

The data server means 216, in response to the appropriate instructions from the user 212, starts/stops sending selected real-time data updates, acknowledges receipt of updated data elements and well known parse requests which indicate the fields to be updated on the display. The data scanner means 218 then scans the updated data elements, compares the updated data elements to the previous values of the data elements, and sends real-time updates for those data elements which have changed to all of the users who have requested that those data elements be updated.

The data link interface 206 is a communication layer between the data presentation interface 202 and the data server interface 204. The data link interface 206 supports a direct communication link and/or conventional real-time data query language (RTDQL). The direct communication link supports internal communications between the data presentation interface 202 and the data server interface 204. The communication link and the RTDQL support the commands to establish or remove a data connection, to select real-time data elements to update and to establish frequency of the data updates. As those skilled in the art will readily comprehend, the format of the interface, such as the encoded command-based communication link, the language-based RTDQL or any other interface, is not important to the present invention beyond permitting communications between the data presentation interface 204 and the data server interface 202 and will, therefore, not be further discussed.

An exemplary flow diagram of data within the software devices which is shown in FIG. 2 will now be described. The user 212 accesses the data format means 208 via the agent keyboard 118 and defines a new real-time data display from a set of available real-time data elements. During the definition of the display, the real-time data elements are positioned, formatted, calculations performed and threshold values established (criteria to change display attributes). Additionally, text data, historical data and external data may be added to create the newly defined display. The defined data display is then stored for later activation by the data present means 210.

When a defined display is activated by the data present means 210, the data present means 210 transmits a request to the data server means 216 via the data link interface 206 to send updates for the data elements to be displayed in the defined display. The data present means 210 thereafter generates the data display and updates the display whenever data updates are received from the data server means 216. When a particular display is terminated, such as when the user 212 changes displays, the data present means 210 sends a request to the data server means 216 to cease sending updates or to change the data elements for which updates are sent.

The data server means 216 receives requests from the data present means 210 to send the data updates. The data server means 216 thereafter manipulates the data elements based on configuration instructions 217 received from the user 212, other personnel or stored in a computer memory. When a request to send data updates is received, the data server means 216 adds the request to a data update list. The data update list thus contains the data elements selected for real-time display. The data update list is then scanned by the data scanner means 218 and data elements which have changed and have been selected for display is sent to the data present means 210 for presentation in the data display.

Having thus described the invention in detail by way of reference to preferred embodiments thereof, it will be apparent that other modifications and variations are possible without departing from the scope of the invention defined in the appended claims. Therefore, the spirit and scope of the appended claims should not be limited to the description of the preferred versions contained herein.

What is claimed is:

1. A data display system for displaying real-time data relating to operation of an automatic call distributor, the data display system comprising:

a data server interface for collecting at least a portion of the real-time data relating to the operation of the automatic call distributor; and a data presentation interface for displaying the at least a portion of the real-time data to a user in at least one data display and for permitting the user to modify in real-time the at least one data display.

2. A data display system as recited in claim 1 comprising:

a data link interface for providing communications between the data server interface and the data presentation interface.

3. The data display system as recited in claim 2 wherein the data link interface supports real-time data query language communications.

4. The data display system as recited in claim 1 wherein the data server interface comprises:

data acquisition means for acquiring the at least a portion of the real-time data relating to the operation of the automatic call distributor;

data server means for storing the at least a portion of the real-time data and for updating data elements contained in the at least a portion of the real-time data in response to the data acquisition means and the user; and data scanner means for monitoring the at least a portion of the real-time data stored in the data server means and for transmitting data elements which have been updated to the data presentation means.

5. The data display system as recited in claim 4 wherein the data presentation interface comprises:

data format means for formatting the at least a portion of the real-time data for display in the data display and for permitting modification of the formatting of the at least a portion of the real-time data in response to the user; and data present means for presenting the at least a portion of the real-time data in the data display in response to the data format means and the user.

6. The data display system as recited in claim 1 wherein the data presentation interface comprises:

data format means for formatting the at least a portion of the real-time data for display in the data display and for permitting modification of the formatting of the at least a portion of the real-time data in response to the user; and data present means for presenting the at least a portion of the real-time data in the data display in response to the data format means and the user.

7. A data display system for displaying at least a portion of real-time data relating to operation of an automatic call distributor, the data display system comprising:

a data server interface for collecting the at least a portion of the real-time data relating to the operation of the automatic call distributor, the data server interface comprising:

data acquisition means for acquiring the at least a portion of the real-time data relating to the operation of the automatic call distributor;

data server means for storing the at least a portion of the real-time data and for updating data elements contained in the at least a portion of the real-time data in response to the data acquisition means and the user; and data scanner means for monitoring the at least a portion of the real-time data stored in the data server means and for transmitting data elements which have been updated to the data presentation means;

a data presentation interface for displaying the at least a portion of the real-time data to a user in at least one data display and for permitting the user to modify the at least one data display; and a data link interface for providing communications between the data server interface and the data presentation interface.

8. The data display system as recited in claim 7 wherein the data link interface supports real-time data query language communications.

9. The data display system as recited in claim 7 wherein the data presentation interface comprises:

data format means for formatting the at least a portion of the real-time data for display in the data display and for permitting modification of the formatting of the at least a portion of the real-time data in response to the user; and data present means for presenting the at least a portion of the real-time data in the data display in response to the data format means and the user.

10. A method for displaying real-time data relating to operation of an automatic call distributor, the real-time data being comprised of data elements, the method comprising the steps of:

selecting data elements to be displayed;

acquiring the selected data elements;

updating the selected data elements;

displaying the selected data elements in a data display to a user;

updating the data display substantially simultaneously as the selected data elements are updated, and modifying the selected data elements to be displayed by the user.

11. The method as recited in claim 10 comprising the steps of:

acquiring the modified selected data elements;

updating the modified selected data elements;

displaying the modified selected data elements in the data display; and updating the data display substantially simultaneously as the modified selected data elements are updated.

12. The method as recited in claim 10 comprising the step of formatting the data display to display the selected data elements in a manner defined by the user.

13. A method for displaying real-time data relating to operation of an automatic call distributor, the real-time data being comprised of data elements, the method comprising the steps of:

selecting data elements to be displayed;

selecting a threshold value for one of the selected data elements;

acquiring the selected data elements;

determining when the one of the selected data elements exceeds the threshold value;

defining a predetermined format for the data display when the one of the selected data elements exceeds the threshold value;

updating the selected data elements;

automatically formatting the data display in accordance with the predetermined format upon determining that the one of the selected data elements exceeds the threshold value; and displaying the selected data elements in a data display to a user and updating the data display substantially simultaneously as the selected data elements are updated.

14. The method as recited in claim 13 wherein the step of acquiring the selected data elements comprises the step of downloading a portion of the selected data elements from a host computer associated with the automatic call distributor.

15. A method for displaying real-time data relating to operation of an automatic call distributor, the real-time data being comprised of data elements, the method comprising the steps of: selecting data elements to be displayed; defining a rate at which the data elements are to be updated, the rate capable of being defined by the user; acquiring the selected data elements; updating the data elements based on the defined rate; and displaying the selected data elements in a data display to a user and updating the data display substantially simultaneously as the selected data elements are updated.

* * * * *